US011822511B2

(12) United States Patent
Kamath

(10) Patent No.: US 11,822,511 B2
(45) Date of Patent: Nov. 21, 2023

(54) FILE ACCESS PERMISSION REVOCATION NOTIFICATION

(71) Applicant: Microsoft Technology Licensing, LLC, Redmond, WA (US)

(72) Inventor: Kristen Kamath, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1369 days.

(21) Appl. No.: 15/168,824

(22) Filed: May 31, 2016

(65) Prior Publication Data

US 2017/0344563 A1    Nov. 30, 2017

(51) Int. Cl.
*G06F 16/11* (2019.01)
*G06F 16/176* (2019.01)
(Continued)

(52) U.S. Cl.
CPC ........ *G06F 16/122* (2019.01); *G06F 3/04842* (2013.01); *G06F 3/04847* (2013.01); *G06F 16/176* (2019.01); *G06F 21/6218* (2013.01); *H04L 51/224* (2022.05); *G06F 2221/2137* (2013.01); *G06F 2221/2141* (2013.01)

(58) Field of Classification Search
CPC .. G06F 16/122; G06F 16/176; G06F 3/04847; G06F 21/6218; G06F 2221/2137; G06F 2221/2141; G06F 3/04842; H04L 51/24
See application file for complete search history.

(56) References Cited

U.S. PATENT DOCUMENTS

| 7,062,532 B1 | 6/2006 | Sweat et al. |
| 7,191,195 B2 | 3/2007 | Koyama et al. |

(Continued)

FOREIGN PATENT DOCUMENTS

| EP | 1 260 906 A1 | 11/2002 |
| JP | 2006268255 A * | 10/2006 |
| WO | 2005103867 A1 | 11/2005 |

OTHER PUBLICATIONS

IsDecisions, "Set alerts to file access or access attempts—IS Decisions", Date : Sep. 6, 2013, ( https://www.isdecisions.com/products/fileaudit/file-access-alerts.htm) (Year: 2013).*

(Continued)

*Primary Examiner* — Mark D Featherstone
*Assistant Examiner* — Faezeh Forouharnejad
(74) *Attorney, Agent, or Firm* — Christopher J. Volkmann; Kelly, Holt & Christenson, PLLC

(57) ABSTRACT

A data storage system providing data access to multiple users is provided. The data storage system includes a data store configured to store electronic files and a processor operably coupled to the data store. Memory is operably coupled to the processor and stores instructions that, when executed, provide an access control component that allows certain users to interact with a given electronic file of the stored electronic files. The processor is configured to detect a change to the given electronic file that affects a user's access to the given electronic file and responsively generate a notification to the user that allows the user to request renewed access to the given electronic file.

20 Claims, 9 Drawing Sheets

(51) Int. Cl.
G06F 21/62 (2013.01)
H04L 51/224 (2022.01)
G06F 3/04842 (2022.01)
G06F 3/04847 (2022.01)

(56) References Cited

U.S. PATENT DOCUMENTS

| | | | |
|---|---|---|---|
| 7,366,843 B2 | 4/2008 | Kingsford | |
| 7,979,494 B1* | 7/2011 | Golovin | G06F 21/552 |
| | | | 709/206 |
| 9,076,128 B2* | 7/2015 | Horvitz | G06Q 10/10 |
| 9,659,179 B1* | 5/2017 | Fredinburg | G06F 21/62 |
| 2002/0152395 A1* | 10/2002 | Zhang | G06F 21/10 |
| | | | 726/26 |
| 2003/0103627 A1 | 6/2003 | Nierzwick et al. | |
| 2003/0110397 A1* | 6/2003 | Supramaniam | H04L 67/42 |
| | | | 726/1 |
| 2005/0091595 A1 | 4/2005 | Shappell et al. | |
| 2008/0097998 A1* | 4/2008 | Herbach | G06F 17/00 |
| 2008/0163347 A1 | 7/2008 | Ratcliff et al. | |
| 2011/0131664 A1* | 6/2011 | Jonsson | G06F 21/10 |
| | | | 726/28 |
| 2011/0302632 A1* | 12/2011 | Garrett | H04L 63/0281 |
| | | | 726/4 |
| 2013/0145481 A1* | 6/2013 | Kozuka | G11B 20/0021 |
| | | | 726/27 |
| 2014/0059217 A1 | 2/2014 | Pizurica | |
| 2014/0101434 A1* | 4/2014 | Senthurpandi | G06F 12/1408 |
| | | | 713/150 |
| 2015/0186660 A1 | 7/2015 | Sherrets et al. | |

OTHER PUBLICATIONS

"Protecting Files from Unauthorized Access—Enterprise Network Security Blog from IS Decisions", Sep. 17, 2015, https://www.isdecisions.com/blog/company-news/protecting-files-unauthorized-access/, (Year: 2015).*

International Search Report and Written Opinion for International Patent Application No. PCT/US2017/033717, dated Jul. 26, 2017, date of filing: May 22, 2017, 12 pages.

Mir, Fawad, "Simple Watcher Monitors Local & Network Folders; Runs Apps Or Sends Emails When Changes Occur", Published: Feb. 13, 2013 Available at http://www.addictivetips.com/windows-tips/monitor-folders-auto-run-apps-or-send-emails-when-changes-occur/.

Agarwal, Amit, "Get Daily Email Reports of your Google Drive Activity", Published on: Nov. 19, 2014 Available at: http://www.labnol.org/internet/google-drive-activity-report/13857/.

"Tracking file and folder changes", Retrieved on: Apr. 26, 2016 Available at: https://www.ibm.com/developerworks/community/help/index.jsp?topic=%2Fcom.ibm.lotus.connections.files.help%2Ft_files_track_changes.html.

"Get Email Notifications of Site Changes", Published on: Aug. 14, 2011 Available at: http://legacy-documentation.concrete5.org/tutorials/get-email-notifications-of-site-changes.

"Share Files and Folders", Retrieved on: Apr. 26, 2016 Available at: https://www.zoho.com/docs/help/file-sharing.html.

* cited by examiner

FILE ACCESS PERMISSION REVOCATION NOTIFICATION

BACKGROUND

Storage of electronic files, such as documents, photos, spreadsheets, presentations, videos, songs, and more is virtually a necessity in modern times. Centralized storage of and access to such files in a network-accessible manner allows the files to be accessed and maintained easily and effectively from a variety of network-connected devices. One form of such storage is an online storage platform that is accessible over the Internet and allows users and/or organizations to create accounts with the on-line storage provider in order to securely upload, access, edit, and delete such electronic files.

In a multi-user file storage environment, it is possible for one user, or an administrator, to make changes to a file (such as renaming it, moving it, or changing access permissions) that can affect the ability of another user to access the file.

The discussion above is merely provided for general background information and is not intended to be used an aide in determining the scope of the claimed subject matter.

SUMMARY

A data storage system providing data access to multiple users is provided. The data storage system includes a data store configured to store electronic files and a processor operably coupled to the data store. Memory is operably coupled to the processor and stores instructions that, when executed, provide an access control component that allows certain users to interact with a given electronic file of the stored electronic files. The processor is configured to detect a change to the given electronic file that affects a user's access to the given electronic file and responsively generate a notification to the user that allows the user to request renewed access to the given electronic file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
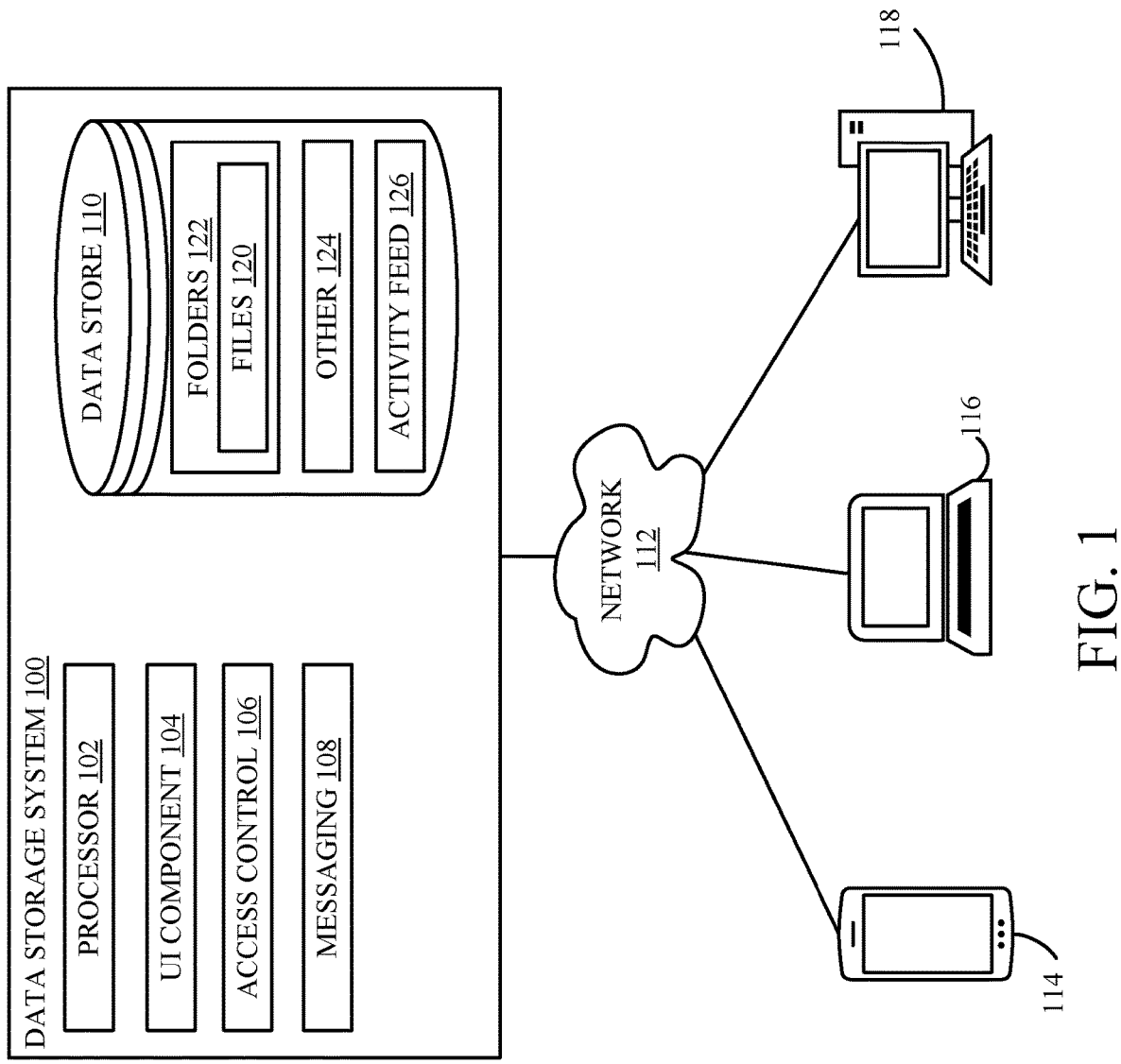
FIG. 1 is a diagrammatic view of an on-line data storage system with which embodiments described herein are particularly useful.

As set forth above, in a multi-user electronic file storage environment, it is possible for a user, or an administrator, to make changes to an electronic file that can affect the ability of another user to access such file. Examples of such changes include renaming the file, moving the file to a different location, or revoking a user's access to the file. When such changes occur, a user who has previously accessed the file may no longer be able to access it. Further, there may be a significant delay between the loss of access and the user's subsequent attempt to access the file.

Once the user attempts to access the file and fails, the user must typically search for files, and rely on their own recollection to remember that they had access to the file and remember the responsible party to whom permission to access the file must be requested. Based on this recollection, the user must contact the responsible party or administrator in order to request that the user be allowed to access the file again. As can be appreciated, at the time that the user is attempting to access the file, the user typically has a relatively immediate need to gain access to the file. Stopping to search for the file, rely on their recollection to remember that they had access to the file, fashion a suitable request to the responsible party, and ultimately receive access again for the file is inconvenient, and even more so if the need to access the file is urgent.

In accordance with embodiments described herein, when a file, such as a document, in which a user has an interest (either expressly or inherently) receives an action that removes the user's access to the file, a notification is generated to the user to indicate that access has been lost. Further, such notification can allow the user to timely request access to the file. Further still, the notification can include the name of the party that has revoked access to the file and/or the name of the party to whom a request may be sent in order to reestablish access. In this way, embodiments described herein generally allow the user to regain access to a file to which access has been lost before the user is in need of access to such file.

While embodiments described herein generally have wide applicability to any electronic system that is able to store electronic files and allow multiple users to selectively access such electronic files, the remainder of this description will be described with respect to an online data storage system that is accessible over the Internet. This embodiment is considered a cloud-computing embodiment.

Cloud computing provides computation, software, data access, and storage services that do not require end-user knowledge of the physical location or configuration of the system that delivers the services. In various embodiments, cloud computing delivers the services over a wide area network, such as the Internet, using appropriate protocols. For instance, cloud computing providers deliver applications over a wide area network and they can be accessed through a web browser or any other computing component. Software or components of the architecture as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, components and functions described herein can be provided from a service provider at a remote location using a cloud computing architecture. Alternatively, they can be provided from a conventional server, or they can be installed on client devices directly, or in other ways.

The description is intended to include both public cloud computing and provide cloud computing. Cloud computing (both public and private) provide substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end-users from managing the hardware. A private cloud may be managed by the organization itself and the infrastructure is typically not shared with other organizations. The organization still maintains the hardware to some extent, such as installations and repairs, etc.

FIG. 1 is a diagrammatic view of an online data storage system with which embodiments described herein are particularly useful. Data storage system 100 includes processor 102, user interface (UI) component 104, access control component 106, messaging component 108, and data store 110. Additionally, while not specifically shown in FIG. 1, data storage system 100 includes suitable circuitry or other arrangements to enable data storage provider 100 to connect to a network, such as network 112 in order to provide access to devices 114, 116, and 118. Each of devices 114, 116, and 118 couples to or interacts with data storage system 100 via a suitable application programming interface.

Processor 102 is illustratively a computer processor that has associated memory and timing circuitry, not separately shown. Processor 102 is illustratively a functional part of data storage system 100 and facilitates the functionality of data storage system 100 in providing access to data in data store 110.

User interface component 104 is illustratively controlled by other components, servers, or items in data storage system 100 in order to generate user interface displays for users using devices 114, 116, and 118. Devices 114, 116, and 118 are merely provided as examples of various user devices that may be used to interact with data storage system 100. In the illustrated example, device 114 is a mobile device, such as a smart phone; device 116 is a laptop or notebook computer; and device 118 is a desktop computer. It will be noted, however, that there can also be a user interface component on devices 114, 116, and 118 which generates those user interface displays as well. Further, it will be noted that user interface component 104 can generate the user interface displays itself, or under the control of other items shown in FIG. 1.

The user interface displays illustratively include user input mechanisms that allow the user to control and manipulate data storage system 100, in order to upload, access, share, and manage electronic files stored within data store 110. The user input mechanisms can include a wide variety of different types of user input mechanisms, such as links, icons, buttons, drop down menus, text boxes, check boxes, etc. In addition, the user input mechanisms can be actuated by the user in a wide variety of different ways. For instance, they can be actuated using touch gestures (where the display is touch sensitive), a hard or soft keyboard or keypad, a point and click device (such as a mouse or trackball), buttons, joysticks, or other actuators. Additionally, where data storage system 100 or one of devices 114, 116, and 118 has speech recognition components, the user input mechanisms can also be actuated by using voice commands.

Access control component 106 may employ an access control list or other suitable structure that includes information that includes permissions or access rights for each user or group of users relative to files stored within data store 110. When an owner of a file uploads or otherwise stores the file in data store 110, the owner can select one or more additional users that may have various access rights, such as reading, editing, deleting, etc. the particular file. Once such access is granted, those users can interact with the file in the associated manner. Additionally, an administrator or other responsible party may also have the ability to set or change access rights relative to one or more files for any particular user. While embodiments described herein generally employ access control component 106, embodiments can be practiced in any suitable manner in which access rights to files for individual users, or groups of users, can be effectively maintained.

Messaging component 108 may include a messaging server or other suitable device or logic that is able to compose and/or send messages to users. Accordingly, messaging component 108 may include an e-mail service that supports the known Simple Mail Transfer Protocol (SMTP). However, messaging component 108 may also include an instant messaging server (SMS) or any other device or logic that is able to provide messages to users. Further, in embodiments where access to data storage system 100 is provided to one or more devices 114, 116, and 118 via an application executing upon said devices, messaging component 108 may include code and/or suitable circuitry to surface such messages or notifications within the application executing upon such user devices. While messaging component 108 is shown as a component of data storage system 100, it is expressly contemplated that messaging component 108 may be remote from data storage system 100 and controlled or otherwise engaged by data storage system 100 to generate suitable messages, such as permission revocation notifications described below.

Data store 110 is shown as a single data store that is local to data storage system 100. However, it will be noted that data store 110, in actuality, may be comprised of a number of different data stores, all of which may be local to data storage system 100, some of which may be local to data storage system 100, or all of which may be remote therefrom. Data store 110 illustratively stores a number of electronic files 120 within folders 122. However, other forms of data 124 may also be stored by data store 110 and be made available by data storage provider 100 for access by users. Additionally, data store 110 may store activity feed 126. In one embodiment, activity feed 126 is a file-specific structure or record that includes various actions that occur relative to the individual file, provided in a human-readable format. For example, an activity feed may indicate that User A generated a file on Jan. 1, 2010. Subsequently, the activity feed may indicate that User A shared the file with User B on Jan. 2, 2010. The activity feed may further indicate that User B edited the file on Jan. 3, 2010, etc. Accordingly, by viewing an activity feed for a particular file, a user can quickly and easily understand the history of the particular file.

Figure 2:
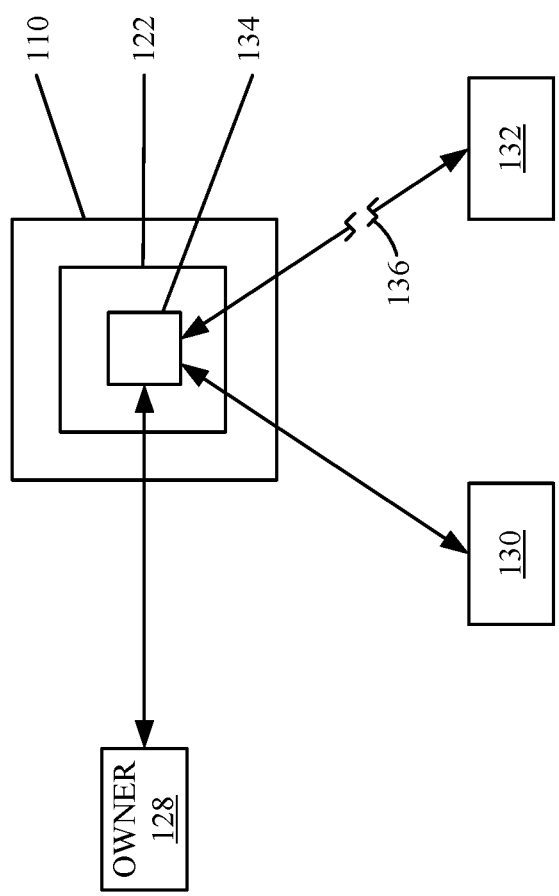
FIG. 2 is a diagrammatic view of multiple users interacting with data storage system in accordance with one embodiment.

FIG. 2 is a diagrammatic view of multiple users interacting with data storage system 100. As shown, an owner 128 has created or otherwise uploaded file 134 into data store 110 of data storage system 100. Owner 128, using a suitable user interface provided by UI component 104, can select users 130 and 132 to have access to file 134. This may be done, for example, to allow user 130 to view the file, and/or to allow user 132 to make changes to the file. This scenario is extremely common in organizations where a team of users will work on a particular file or project. As shown in FIG. 2, while user 132 previously had access, at some point, such access of user 132 to file 134 is revoked or otherwise lost as indicated at reference numeral 136. This may occur for any number of reasons. For example, owner 128 may rename file 134. Then, if user 132 attempts to access file 134 using the original file name, such access will fail. Another way in which access can be lost is if owner 128 moves file 134 out of a particular folder 122 into a different folder. User 132, attempting to access file 134 in the original folder will no longer see file 134 and the access will also fail. Further, access can be expressly revoked by owner 128 by interacting with data storage system 100 to indicate that user 132 should no longer have access to file 134. Yet another way in which access can be lost is if user 132 is provided access to file 134 via a link or URL that has an expiration date or time which has occurred. For example, the access provided to user 132 may be via link that lasts for one week. Once the week has expired, user 132 will no longer have access to file 134. As set forth above, user 132 is typically not aware of the loss of access to file 134. Subsequently, if user 132 should need to access file 134, user 132 may need to search for the file and rely on their own recollection to remember that they had access to file 134 and to ask owner 128 to restore access. Then, owner 128 can restore such access to user 132 who may subsequently re-access file 134. This process is inconvenient for user 132, as well as owner 128.

In accordance with embodiments described herein, a user, such as user 132 (described above with respect to FIG. 2) can specify or otherwise indicate an interest in a file, such as file 134 (shown in FIG. 2) and be notified if access to the specified file is lost.

Figure 3:
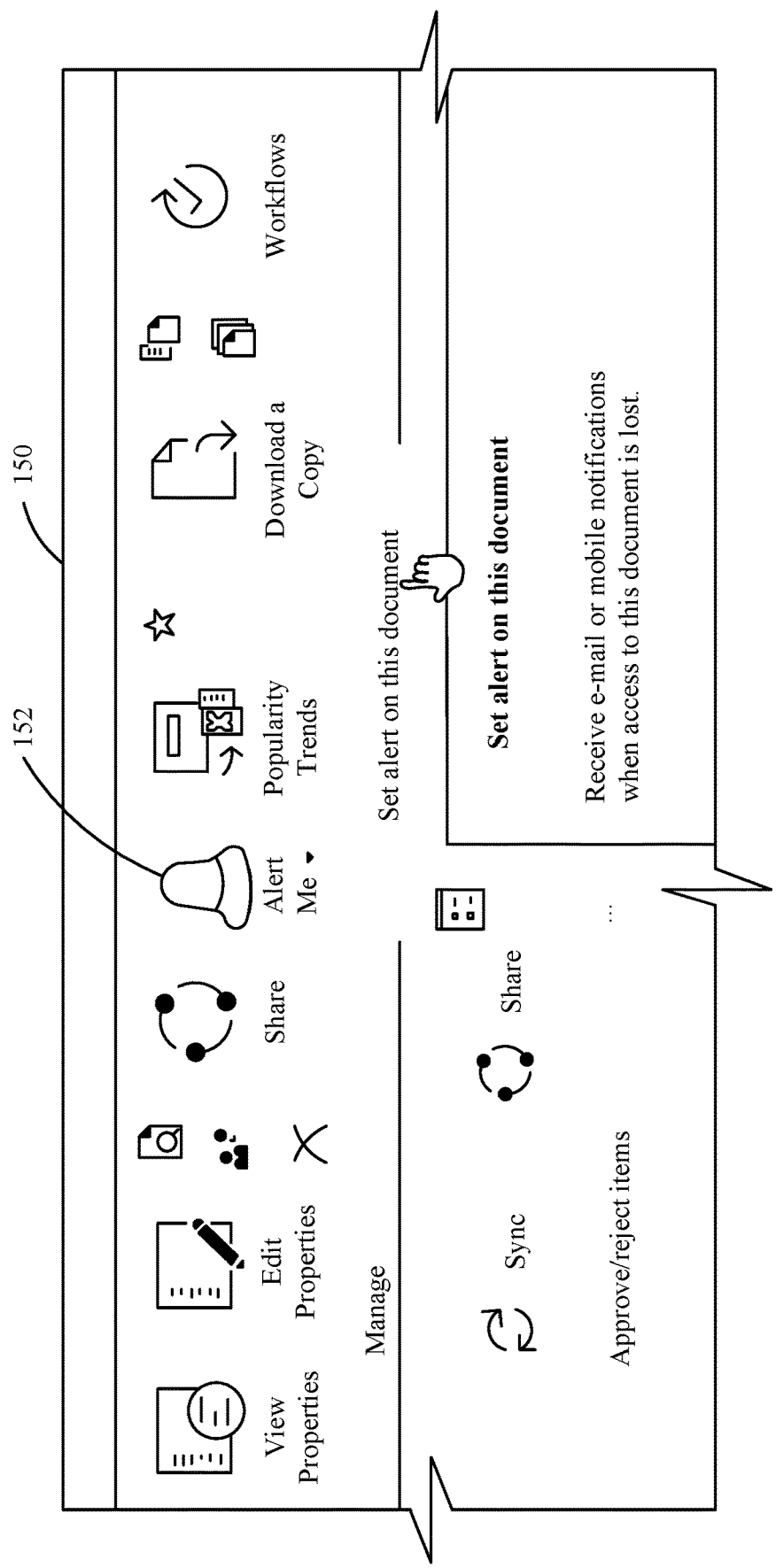
FIG. 3 is a diagrammatic view of a screenshot of a user interface that allows a user to set an access alert relative to a specific file.

FIG. 3 is a diagrammatic view of a screenshot of a user interface, provided by UI component 104, that allows a user to set an access alert relative to a specific file. As shown in FIG. 3, user interface 150 includes an alert user interface element 152 that, when selected, will allow the user to receive a notification when access to the file is lost. User interface 150 may be context sensitive such that when a user is interacting with a specific file, a user interface 150 may be displayed. Further, when a user is interacting with a list of files, right clicking on a particular file may invoke user interface 150 to allow the user to define an alert with respect to access being lost on the selected file. Upon selecting or otherwise defining an alert regarding loss of access for a specific file, data storage system 100 will store, an association between the user and the selected file. Subsequently, if access to the selected file changes, as determined via an update to an activity feed for the file, or other suitable action, data storage system 100 can identify one or more users who have set alerts relative to their loss of access and automatically engage messaging system 108 to generate notifications to the user(s). This process can be triggered automatically when a change to file access is generated by an owner 128 or other responsible party. Further, the process can be triggered when a user having suitable rights makes a change that can affect access, such as renaming or moving a file. Further still, embodiments described herein also include periodically polling or otherwise checking activity feeds of files for updated or new activities and then automatically generating notifications to users based on stored alert associations. This process could occur periodically, or continually. Accordingly, embodiments described herein can include the triggering of the process when a file access change is made, as well as periodically polling for access changes and sending notifications.

While the embodiment illustrated with respect to FIG. 3 allows a user to set an alert explicitly on a particular file, embodiments described herein also include the automatic or inherent identification of a user's interest in a file based upon the user's interaction with the file. For example, if a user has spent over a certain threshold of time editing or reviewing a document, or has accessed a document a specific number of times within a defined time window, embodiments described herein may automatically set an alert for the user relative to the file without the user having to set such alert explicitly. Moreover, the threshold(s) used to automatically identify this interest in a file can be set by a user or disabled entirely.

Figure 4:
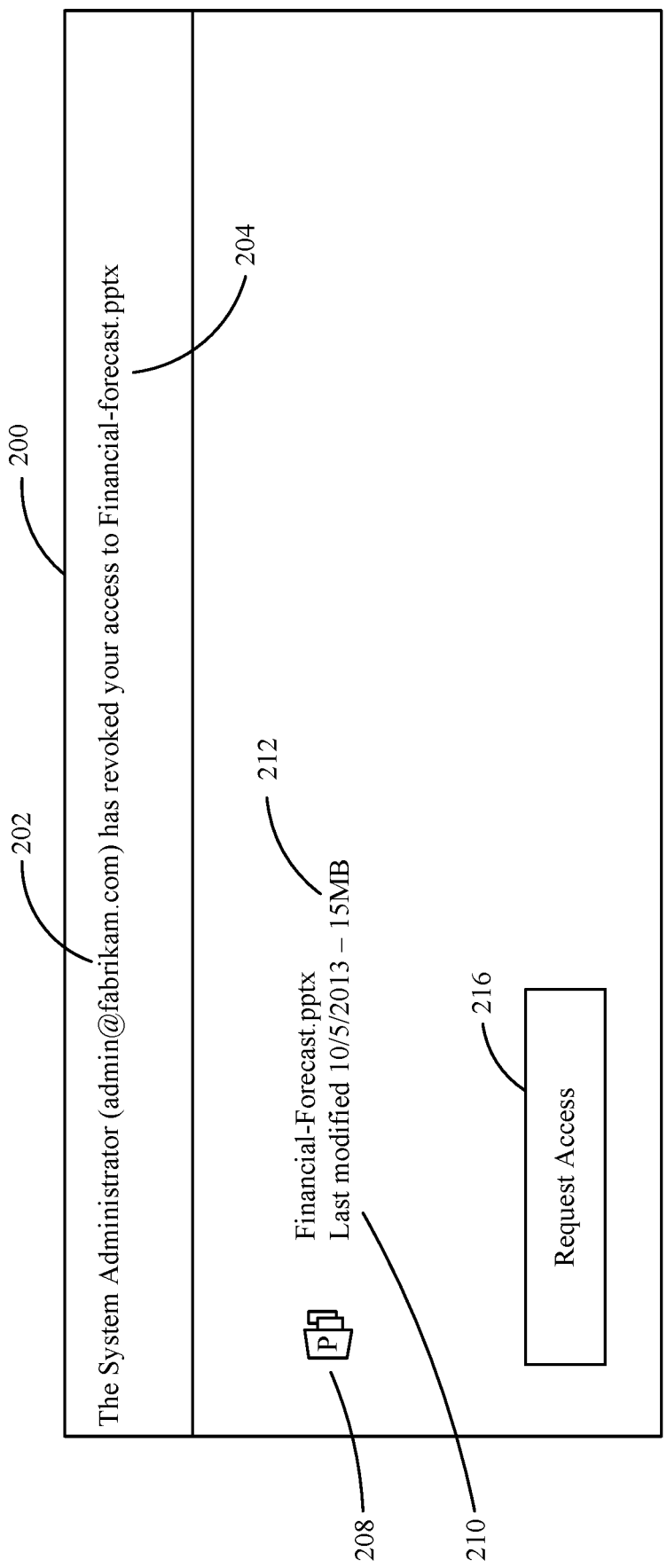
FIG. 4 is a diagrammatic view of a notification generated to a user that has lost access to a file.

FIG. 4 is a diagrammatic view of a notification generated to a user that has lost access to a file in accordance with one embodiment. As set forth above, this notification may be sent based on a determination of loss of access to a in which file a user has expressly or inherently indicated an interest. The notification 200 may be in the form of an e-mail, or other suitable communication, and generally includes an indication of the responsible party, such as system administrator 202, and the filename 204 for which access has been revoked. Further, notification 200 can also provide summary information, such as the type of file 208 for which access was revoked, the date of the last modification 210 relative to the file, and the file size 212. Further still, notification 200 may include a user interface element 216 that, when selected or otherwise engaged by the user, will automatically generate and transmit a request that access be re-enabled for the specified file. Further, since data storage system 100 knows the party that has revoked access to the indicated file, the communication can be automatically routed to the proper party. In this way, user interactions with data storage system 100 are more efficient and more timely. Additionally, access can be restored to the file before the user who has lost access subsequently requires such access.

Figure 5:
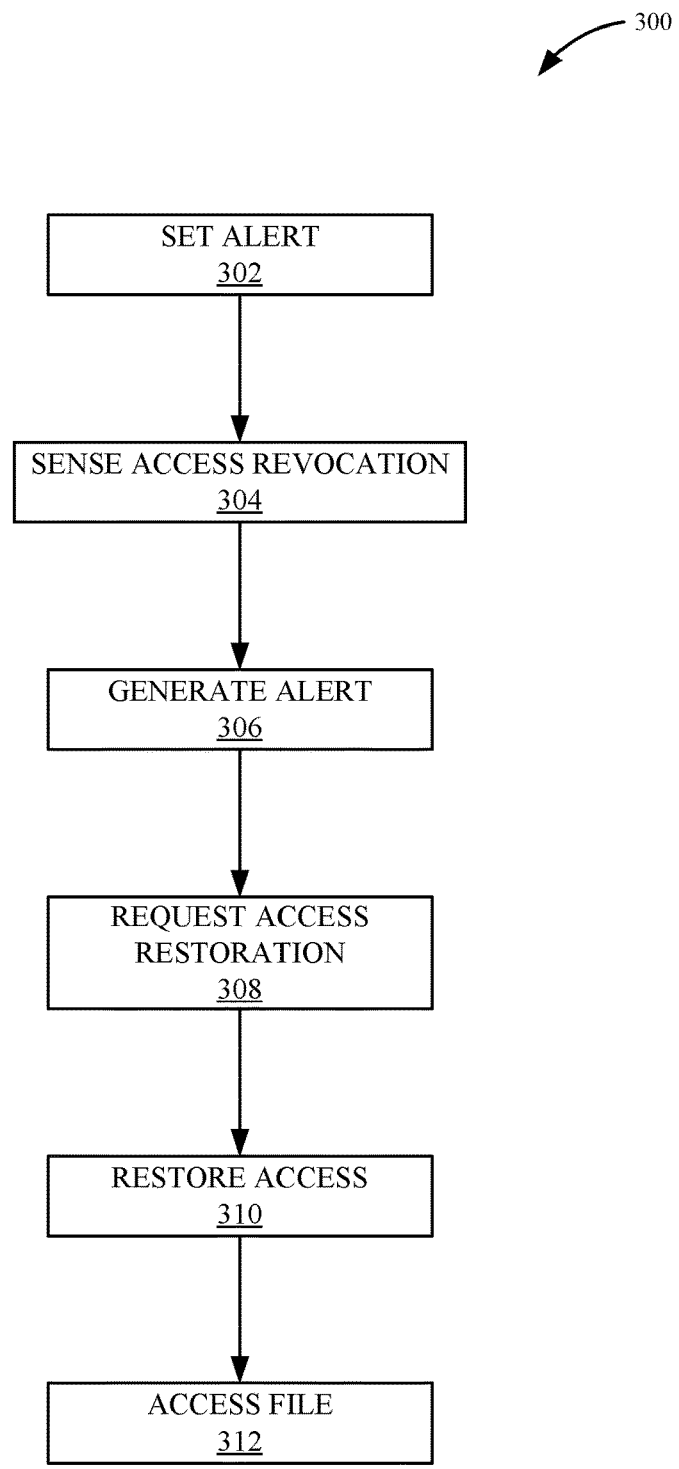
FIG. 5 is a flow diagram of a method of interacting with a data storage system in accordance with one embodiment.

FIG. 5 is a flow diagram of a method of interacting with a data storage system in accordance with one embodiment. Method 300 begins at block 302 where a user sets an alert relative to access for a specific file. Setting the alert can be done using a user interface such as user interface 150 (shown in FIG. 3) or any other suitable manner. Next, at block 304, data storage system 100 senses or otherwise detects access revocation for the file specified in the alert. This may occur as an activity feed for the specified file is updated or in any other suitable way. Regardless, at block 306, alert information stored by data storage system 100 is accessed to identify one or more users who have set alerts relative to losing access to the specified file. Upon identification of such user(s), data storage system 100 generates, or otherwise causes, one or more notifications to the specified user(s) indicating that access to the specified file has been lost. An example of such a notification is shown in FIG. 4. However, embodiments described herein can provide the notification in any suitable manner. At block 308, the user receiving the notification regarding revocation or loss of access to the file can request restoration of access, as indicated at block 308. This can be done, in one embodiment, by simply selecting or otherwise engaging a user interface element provided in the notification itself, such as request access button 216 (shown in FIG. 4). The request is automatically routed to the responsible party, such as the person or entity that has the ability to restore access to the file. At block 310, file access is restored for the user, and at block 312 the user again accesses the file.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, the figures show a number of blocks with functionality ascribed to each block. It will be noted that fewer blocks can be used so the functionality is performed by fewer components. Also, more blocks can be used with the functionality distributed among more components.

It will also be noted that data storage system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
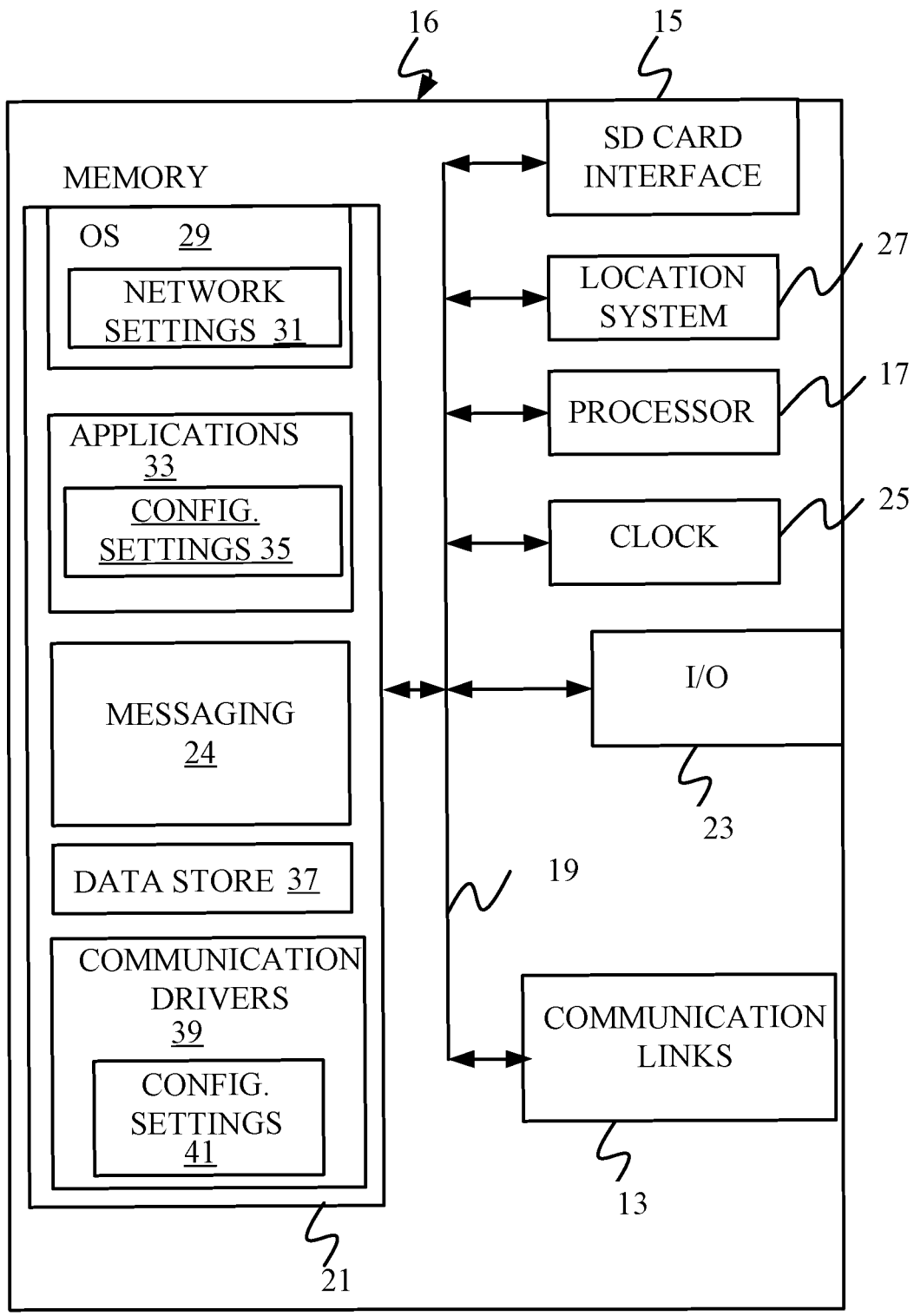
FIG. 6 is a simplified block diagram of one illustrative embodiment of a handheld or mobile computing device that can be used as a user's or client's hand held device in which the present system (or parts of it) can be deployed.
Figure 7:
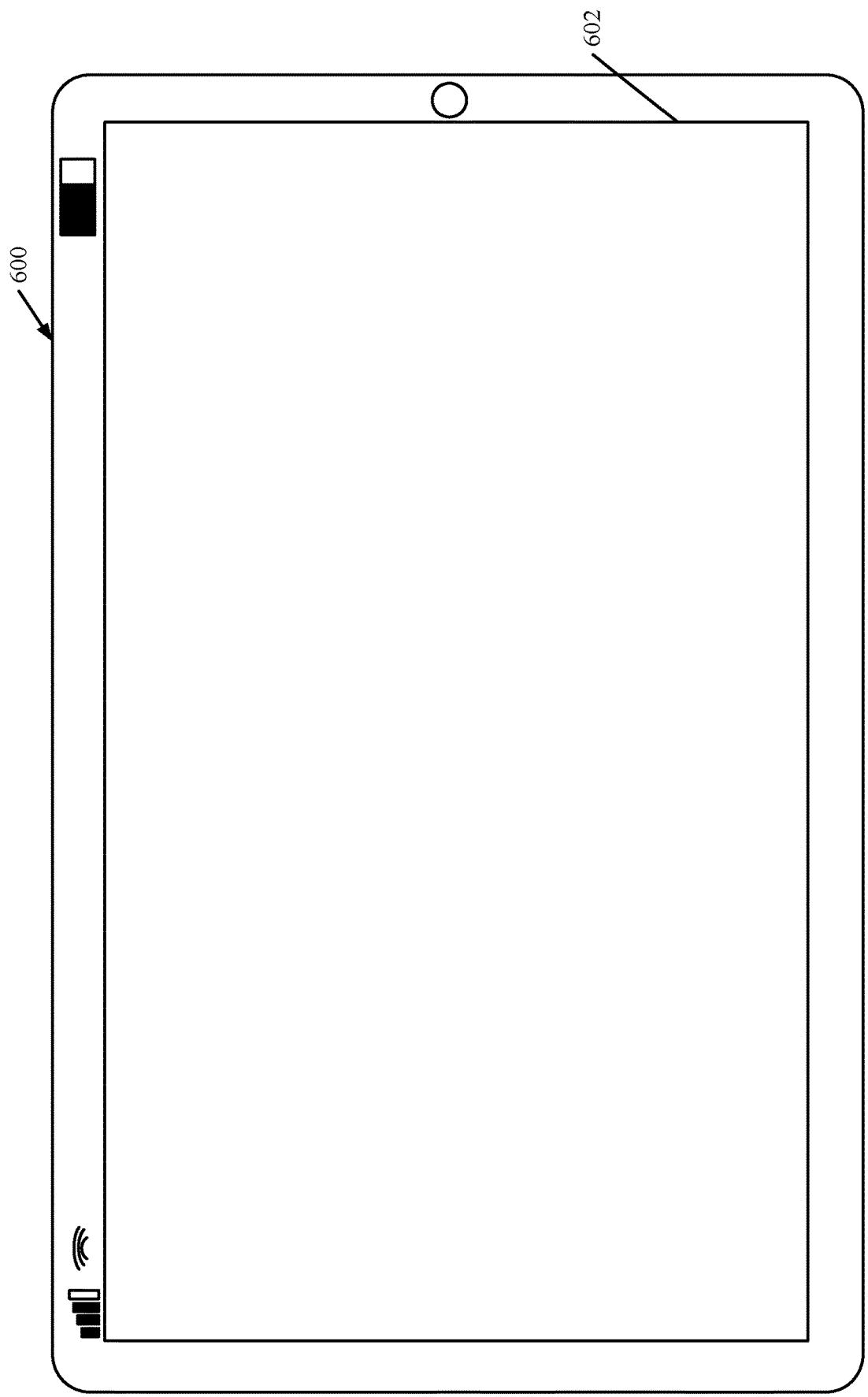
FIGS. 7 and 8 show embodiment in which a user's device is a tablet computer or smartphone, respectively.
Figure 8:
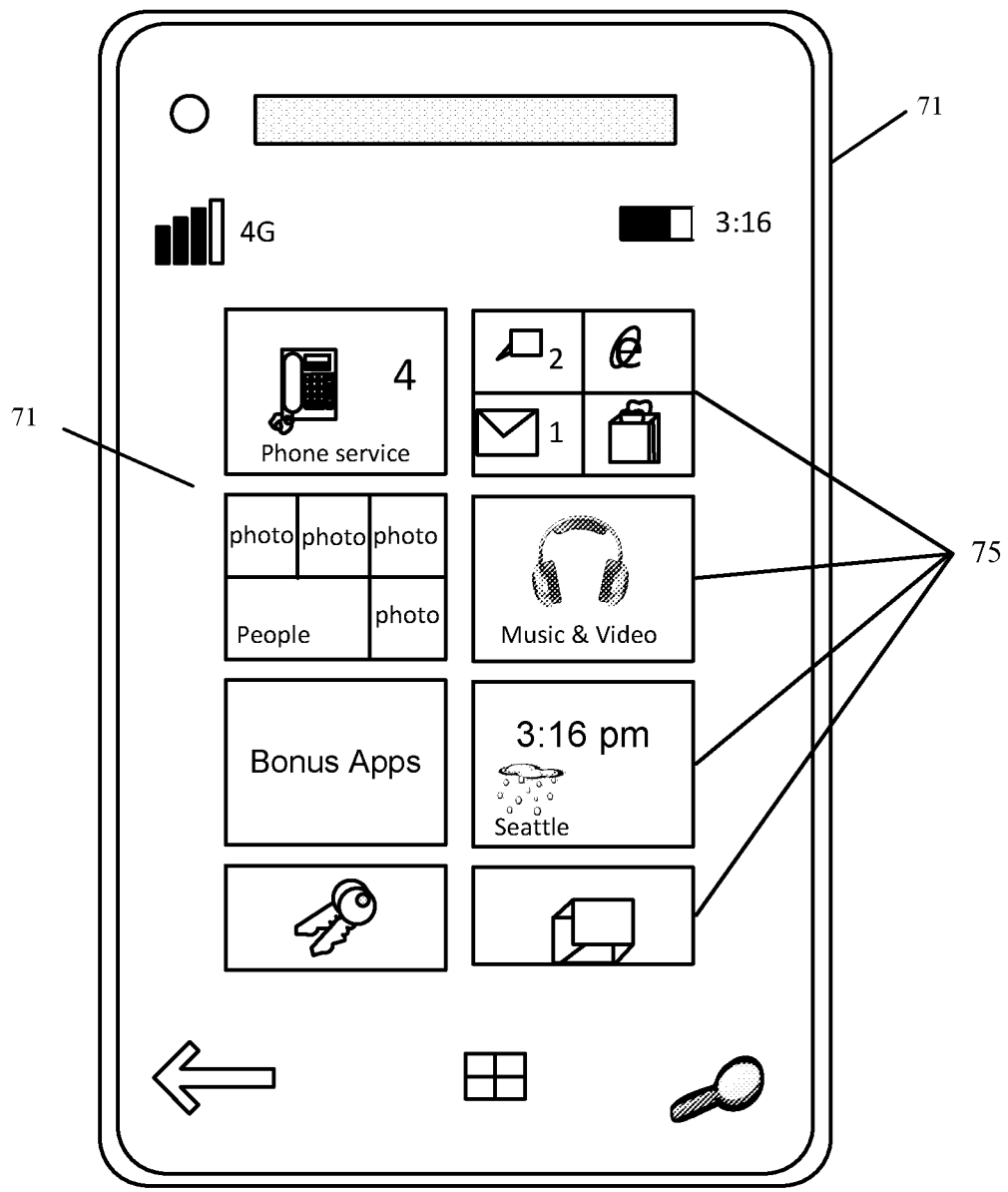

FIG. 6 is a simplified block diagram of one illustrative embodiment of a handheld or mobile computing device that can be used as a user's or client's hand held device 16, in which the present system (or parts of it) can be deployed. FIGS. 7 and 8 are examples of handheld or mobile devices.

FIG. 6 provides a general block diagram of the components of a client device 16 that can run components of data storage system 100 or that interact with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with user interface display displayed on the display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1×rtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 8 is similar to FIG. 7 except that the mobile device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
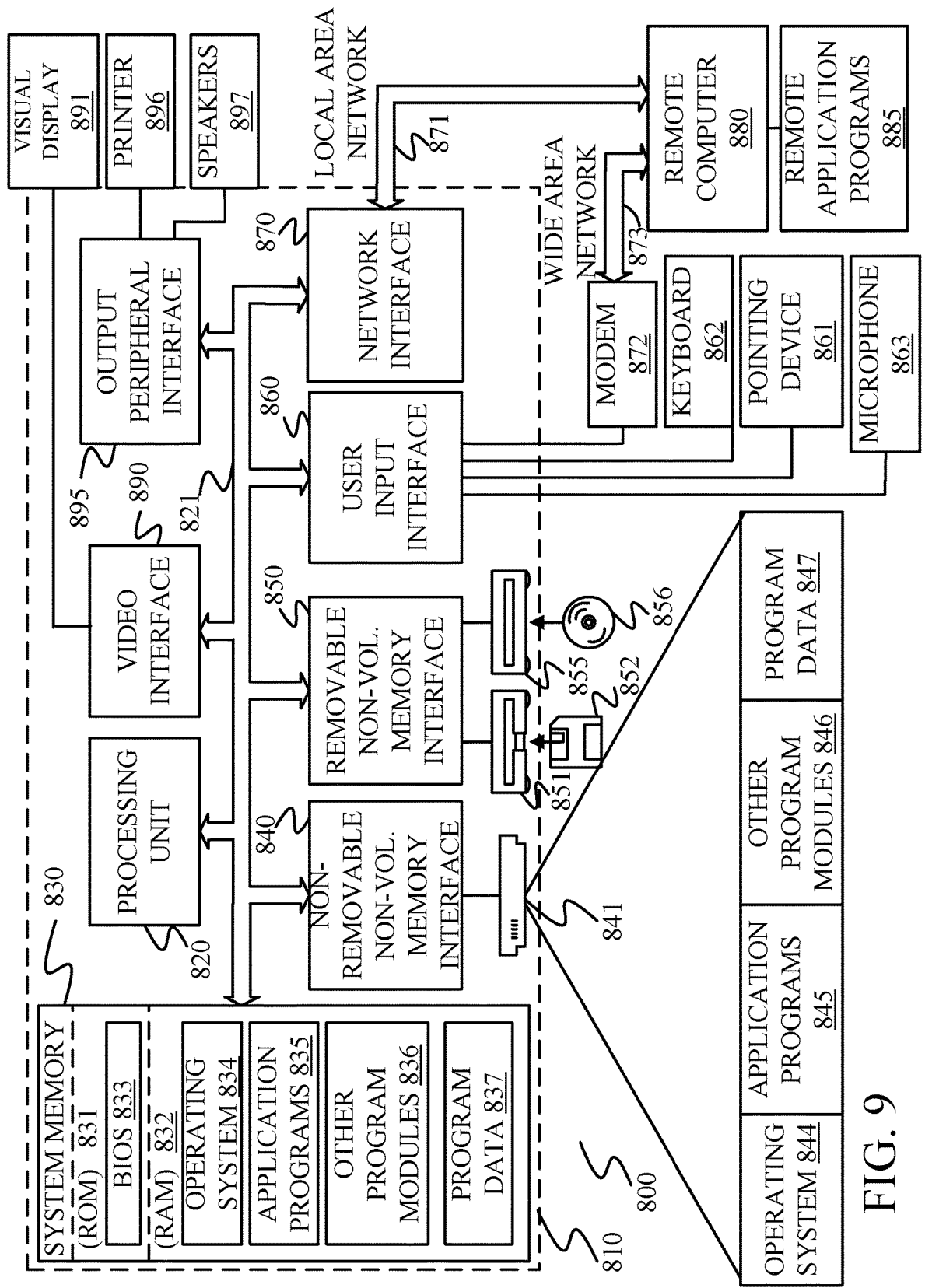
FIG. 9 is a diagrammatic view of a computing environment in which an online storage platform, or parts of it, (for example) can be deployed.

FIG. 9 is one embodiment of a computing environment in which architecture 100, or parts of it, (for example) can be deployed. With reference to FIG. 9, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a data storage system that provides data access to multiple users. The data storage system includes a data store configured to store electronic files and a processor operably coupled to the data store. Memory is operably coupled to the processor and stores instructions that, when executed, provide an access control component that allows certain users to interact with a given electronic file of the stored electronic files. The processor is configured to detect a change to the given electronic file that affects a user's access to the given electronic file and responsively generate a notification to the user that allows the user to request renewed access to the given electronic file.

Example 2 is the data storage system of any or all previous examples wherein the processor is configured to detect a change in the given electronic file when an activity feed for the given electronic file is changed.

Example 3 is the data storage system of any or all previous examples wherein the change to the electronic file is a change in a name of the given electronic file.

Example 4 is the data storage system of any or all previous examples wherein the change to the given electronic file is a change in location of the given electronic file.

Example 5 is the data storage system of any or all previous examples wherein the change to the given electronic file is a change in access rights for the user relative to the given electronic file.

Example 6 is the data storage system of any or all previous examples wherein the notification includes an indication of the party that caused the change to the given electronic file.

Example 7 is the data storage system of any or all previous examples wherein the notification includes an element that, when selected, causes the data storage system to generate a request to a responsible party indicative of the renewed access request.

Example 8 is a data storage system that provides data access to multiple users. The data storage system includes a data store configured to store electronic files and a processor operably coupled to the data store. Memory is operably coupled to the processor and stores instructions that, when executed, cause the processor to set an alert for a user's loss of access to a selected file of the stored electronic files. The processor is configured to detect a loss of the user's access to selected electronic file and responsively generate a notification to the user that allows the user to request renewed access to the selected electronic file.

Example 9 is the data storage system of any or all previous examples wherein the processor is configured to determine that a user's interaction with the selected file is above a threshold and automatically set the alert.

Example 10 is the data storage system of any or all previous examples wherein the threshold includes a number of times that the user has interacted with the file within a defined time period.

Example 11 is the data storage system of any or all previous examples wherein the alert is set by the user.

Example 12 is the data storage system of any or all previous examples and further comprising a user interface component that is configured to generate a user interface containing a user interface element that, when selected, sets an alert for a user's loss of access to the selected file.

Example 13 is the data storage system of any or all previous examples and further comprising a messaging system configured to generate the notification to the user.

Example 14 is the data storage system of any or all previous examples wherein the messaging system includes an email system configured to generate an email to the user containing a user interface element that, when selected, generates an email requesting renewed access to the selected electronic file.

Example 15 is a computer-implemented method of providing access to electronic files. The method includes determining a user's interest in an electronic file and based on determining the user's interest, setting a loss of access alert on the electronic file. The user's loss of access to the file is sensed and a notification is transmitted to the user. The notification is indicative of the loss of access and is configured to enable the user to request access to the file.

Example 16 is the computer-implemented method of any or all previous examples wherein determining the user's interest in the electronic file is performed automatically based on the user's interactions with the electronic file.

Example 17 is the computer-implemented method of any or all previous examples wherein determining the user's interest in the electronic file includes receiving, through a user interface, user input indicative of setting the loss of access alert.

Example 18 is the computer-implemented method of any or all previous examples wherein the notification includes information indicative of a responsible party for requesting access to the file.

Example 19 is the computer-implemented method of any or all previous examples wherein the notification is an email.

Example 20 is the computer-implemented method of any or all previous examples wherein the notification includes an element that, when selected, generates and transmits an email to the responsible party to request renewed access to the file.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data storage system comprising:
   a data store configured to store electronic files;
   a processor operably coupled to the data store;
   memory operably coupled to the processor and storing instructions that, when executed, cause the data storage system to;
   provide an access control component that allows a particular user to access a given electronic file, of the stored electronic files, based on a particular access right assigned to the particular user;
   detect a change to the particular access right such that the particular user no longer has the access to the given electronic file;
   determine a loss of access rights for the particular user relative to the given electronic file based on the detected change to the particular access right;
   in response to the loss of access rights, send an electronic message to the particular user that is separate from the given electronic file and includes:
   a file identifier that identifies the given electronic file and indicates the loss of access rights,
   an indication of a party that caused the loss of access rights for the particular user to the given electronic file, and
   a user input mechanism actuatable to send a request for renewed access relative to the given electronic file; and
   in response to an indication of user actuation of the user input mechanism in the electronic message, send the request for renewed access for the particular user relative to the given electronic file.

2. The data storage system of claim 1, wherein the electronic message comprises an electronic mail (email) message.

3. The data storage system of claim 1, wherein the request for renewed access is sent to a responsible party having a right to grant the renewed access for the particular user to the given electronic file.

4. A computer system comprising:
   a processor; and
   memory operably coupled to the processor and storing instructions that, when executed, cause the processor to:
   receive an indication of an access right corresponding to a particular user, wherein the access right allows the particular user access to a particular electronic file;
   store an alert association between the particular user and the particular electronic file, the alert association defining a loss of access alert for a loss of the access right, corresponding to the particular user, to the particular electronic file;
   detect occurrence of the loss of the access right of the particular user to the particular electronic file, wherein, after the occurrence of the loss of the access right, the particular user no longer has the access to the particular electronic file;
   in response to the detected occurrence of loss of the access right,
   send an electronic message to the particular user based on the stored alert association, wherein the electronic message is separate from the particular electronic file and includes:
   a file identifier that identifies the particular electronic file and indicates the detected loss of the access right,
   an indication of a party that caused the loss of access right for the particular user to the particular electronic file, and
   a user input mechanism actuatable to send a request for renewed access relative to the particular electronic file: and
   in response to an indication of user actuation of the user input mechanism in the electronic message, send the request for renewed access for the particular user relative to the particular electronic file.

5. The computer system of claim 4, wherein the instructions cause the processor to:
   automatically set the loss of access alert based on a determination that user interaction with the particular electronic file is above a threshold.

6. The computer system of claim 5, wherein the threshold includes a number of times that the particular user has interacted with the particular electronic file within a defined time period.

7. The computer system of claim 4, wherein the instructions cause the processor to generate a user interface containing a user interface element that, when selected, sets the alert for the loss of the access right to the particular electronic file.

8. The computer system of claim 4, wherein the access to the particular electronic file comprises at least one of:
   read access;
   edit access; or
   delete access.

9. The computer system of claim 4, and further comprising an electronic mail (email) system configured to generate an email to the user containing a user interface element that, when selected, generates an email requesting renewed access to the particular electronic file.

10. The data storage system of claim 1, wherein the instructions cause the data storage system to:
    generate a user interface including a user interface element that, when actuated, sets an alert for the loss of access rights for the particular user to the given electronic file;
    store an alert association between the particular user and the given electronic file, the alert association defining the loss of access alert for a loss of access rights of the particular user to the given electronic file; and
    in response to the detected change to the particular access right,
    access the stored alert association, and
    send the electronic message to the particular user based on the stored alert association.

11. The data storage system of claim 1, wherein the instructions, when executed, cause the data storage system to:
    determine one or more users who have lost the access rights relative to the given electronic file; and
    determine that the one or more users includes the particular user and, in response, send the electronic message to the particular user.

12. The data storage system of claim 1, wherein the instructions, when executed, cause the data storage system to:

determine a user interest in the given electronic file based on a determination that user interaction by the particular user with the given electronic file is above a threshold; and based on the user interest, set a loss of access alert on the given electronic file.

13. The data storage system of claim 12, wherein the instructions, when executed. cause the data storage system to:

send the electronic message to the particular user based on the loss of access alert set on the given electronic file.

14. A computer-implemented method comprising:

providing an access control component that allows a particular user to access a given electronic file based on a particular access right assigned to the particular user;

detecting a change to the particular access right such that the particular user no longer has the access to the given electronic file;

determining a loss of access rights for the particular user relative to the given electronic file based on the detected change to the particular access right;

in response to the loss of access rights, sending an electronic message to the particular user that is separate from the given electronic file and includes:

a file identifier that identifies the given electronic file and indicates the loss of access rights, an indication of a party that caused the loss of access rights for the particular user to the given electronic file, and a user input mechanism actnatable to send a request for renewed access relative to the given electronic file; and in response to an indication of user actuation of the user input mechanism in the electronic message, sending the request for renewed access for the particular user relative to the given electronic file.

15. The computer-implemented method of claim 14, wherein the electronic message comprises an electronic mail (email) message.

16. The computer-implemented method of claim 14, and further comprising sending the request for renewed access to a responsible party having a right to grant the renewed access for the particular user to the given electronic file.

17. The computer-implemented method of claim 14, and further comprising:

determining one or more users who have lost the access rights relative to the given electronic file; and determining that the one or more users includes the particular user and, in response, sending the electronic message to the particular user.

18. The computer-implemented method of claim 14, and further comprising:

generating a user interface including a user interface element that, when actuated, sets an alert for the loss of access rights for the particular user to the given electronic file;

storing an alert association between the particular user and the given electronic file, the alert association defining the loss of access alert for a loss of access rights of the particular user to the given electronic file; and in response to the detected change to the particular access right, accessing the stored alert association, and sending the electronic message to the particular user based on the stored alert association.

19. The computer-implemented method of claim 14, and further comprising:

determining a user interest in the given electronic file based on a determination that user interaction by the particular user with the given electronic file is above a threshold; and based on the user interest, setting a loss of access alert on the given electronic file.

20. The computer-implemented method of claim 19, and further comprising:

sending the electronic message to the particular user based on the loss of access alert set on the given electronic file.

* * * * *